United States Patent
Mendoza et al.

(10) Patent No.: US 8,172,202 B2
(45) Date of Patent: May 8, 2012

(54) BUTTERFLY VALVE ASSEMBLY INCLUDING A BEARING ASSEMBLY FOR SERRATED SPLINE CONSTRAINT

(75) Inventors: Anthony Mendoza, Phoenix, AZ (US); Mike Kolic, Laveen, AZ (US); Doug Smith, Phoenix, AZ (US); Ben Ho, Tempe, AZ (US); Louie Timothy Gaines, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 12/429,819

(22) Filed: Apr. 24, 2009

(65) Prior Publication Data

US 2010/0270489 A1    Oct. 28, 2010

(51) Int. Cl.
*F16K 1/22* (2006.01)

(52) U.S. Cl. ......... 251/308; 251/305; 251/306; 251/366

(58) Field of Classification Search .................. 251/305, 251/306, 308, 366, 214
See application file for complete search history.

(56) References Cited

U.S. PATENT DOCUMENTS

| | | | | |
|---|---|---|---|---|
| 2,475,509 A | * | 7/1949 | McLeod | 384/125 |
| 2,924,424 A | * | 2/1960 | Titterington | 251/305 |
| 3,059,897 A | * | 10/1962 | Jensen | 251/306 |
| 3,508,737 A | * | 4/1970 | Sikorcin | 251/306 |
| 3,556,475 A | * | 1/1971 | Olenik | 251/306 |
| 5,061,089 A | * | 10/1991 | Bair et al. | 384/535 |
| 5,201,291 A | | 4/1993 | Katoh et al. | |
| 5,490,487 A | | 2/1996 | Kato et al. | |
| 5,934,250 A | | 8/1999 | Fujikawa et al. | |

FOREIGN PATENT DOCUMENTS

EP    0226999 A2    1/1987

* cited by examiner

*Primary Examiner* — John Fristoe, Jr.
*Assistant Examiner* — Marina Tietjen
(74) *Attorney, Agent, or Firm* — Ingrassia Fisher & Lorenz, P.C.

(57) ABSTRACT

Butterfly valves assemblies are provided that include a flowbody, a butterfly plate, an actuator and an upper chimney and a lower chimney disposed within the flowbody. The flowbody has an inner surface defining a channel. The butterfly plate is disposed in the channel, is rotationally mounted to the flowbody, and has an outer periphery. The actuator has an actuator output shaft that is coupled to the valve shaft via a serrated spline coupling. The upper chimney and the lower chimney are configured to include bearing assemblies that constrain radial loads and thrust loads exerted upon the valve shaft and minimize misalignment of the serrated spline coupling.

10 Claims, 5 Drawing Sheets

BUTTERFLY VALVE ASSEMBLY INCLUDING A BEARING ASSEMBLY FOR SERRATED SPLINE CONSTRAINT

TECHNICAL FIELD

The inventive subject matter relates to pneumatic valve assemblies and, more particularly, to butterfly valve assemblies including a serrated spline coupling.

BACKGROUND

Valves may be employed in any one of numerous situations. For example, valves may be used in an air distribution system to direct airflow from one portion of an aircraft to another. In this regard, pneumatic valves may be disposed in a duct between an air source and one or more outlets for exhausting the received air to desired areas within the aircraft, such as, for example, to an aircraft cabin or an underfloor section of the aircraft.

One exemplary type of pneumatic valve that has been employed in aircraft is a butterfly valve. A butterfly valve is typically made up of a valve flowbody and a butterfly plate. The valve flowbody may be made of a rigid material, such as metal, and includes an inner surface defining a channel. The valve flowbody is configured to be disposed between two ducts or disposed in a portion of a single duct. The butterfly plate is made of a rigid material as well and is rotationally mounted to the valve flowbody. Conventionally, the butterfly plate is positioned in the channel such that a minimum clearance is formed with the inner surface of the valve flowbody. An actuator and a spring may be used to control the rotation of the butterfly plate.

Typically, the butterfly plate is moved between closed, open, and partially open positions. When in the closed position, the butterfly plate substantially blocks the channel to prevent, or at least inhibit, fluid from flowing therethrough. When fluid flows through the valve flowbody in a forward direction, the butterfly plate moves to the open or partially open position to allow fluid flow through the channel. An actuator is typically used as a control device to mechanically cause the disk of a butterfly valve to rotate. Actuators can be either manual or automatic and operated by hand, electronics, pneumatics, hydraulics, or springs.

Some butterfly valves include a serrated spline coupling to couple the butterfly valve to the actuator. In an embodiment of this type, an electromechanical actuator is used to drive a valve shaft of the butterfly valve via an actuator output shaft and the serrated spline coupling. The serrated spline coupling provides for the transfer of torque from the actuator to the valve shaft though rotary motion of the actuator output shaft.

Although the aforementioned valve configuration including a serrated spline coupling operates adequately, it may exhibit some drawbacks. For example, when the valve is operational, misalignment at the serrated spline interface, and more particularly at an interface between the actuator output shaft and the butterfly valve shaft, may occur. More specifically, the flow of fluid through the valve flowbody may cause differential pressure across the butterfly plate causing the butterfly valve shaft to deflect (bow) between a ball bearing that supports the butterfly valve shaft on either side of the butterfly plate. The deflection of the butterfly valve shaft may cause radial and angular misalignment at the serrated spline interface. The misalignment may lead to binding at the interface of the butterfly valve shaft and the actuator output shaft as well as generate substantial side loads that may be transferred into the output shaft of the actuator. This misalignment at the spline interface may additionally cause the motor of the actuator to stall or overload the gear train in an output section and result in increased wear. In some cases, in addition to misalignment at the spline interface, the thrust and radial loads generated by the butterfly plate must be properly distributed through a bearing system to minimize the occurrence of valve malfunction.

Accordingly, there is a need for a butterfly valve that includes a means for constraining forces exerted upon an interface that exist at a serrated spline interface, between an actuator output shaft and a butterfly valve shaft. More specifically, there is a need for a means to minimize misalignment of an actuator output shaft and a butterfly valve shaft at the serrated spline interface. In addition, it would be desirable for the valve to have an increased life expectancy, to be lightweight, and to be relatively inexpensive to implement. Furthermore, other desirable features and characteristics of the inventive subject matter will become apparent from the subsequent detailed description and the appended claims, taken in conjunction with the accompanying drawings and the foregoing technical field and background

BRIEF SUMMARY

Butterfly valves are provided that include a flowbody, a butterfly plate, and a means for constraining forces exerted upon an included serrated spline interface.

In an embodiment, by way of example only, the valve includes a flowbody having an inner surface defining a channel; a butterfly plate disposed in the channel and rotationally mounted to the flowbody, the butterfly plate having a valve shaft coupled thereto and positioned at an angle to the inner surface of the flowbody; an actuator having an actuator output shaft coupled to the valve shaft via a serrated spline coupling, the actuator configured to actuate the butterfly plate; and an upper chimney and a lower chimney disposed within the flowbody, the upper chimney and the lower chimney configured to constrain radial loads and thrust loads exerted upon the valve shaft and minimize misalignment of the serrated spline coupling.

In another embodiment, by way of example only, the valve includes a flowbody having an inner surface defining a channel; a butterfly plate disposed in the channel and rotationally mounted to the flowbody, the butterfly plate having a valve shaft coupled thereto and positioned at an angle to the inner surface of the flowbody; an actuator having an actuator output shaft coupled to the valve shaft via a serrated spline coupling, the actuator configured to actuate the butterfly plate; an upper chimney disposed within the flowbody, the upper chimney comprising a bearing assembly including an inboard bearing and an outboard bearing, and a shim stack, the outboard bearing configured to encompass an upper end of the valve shaft and the serrated spline coupling, the bearing assembly configured to create a load path in an axial direction to constrain radial and thrust loads exerted on the valve shaft and minimize misalignment of the serrated spline coupling; and a lower chimney disposed within the flowbody, the lower chimney comprising an outboard bearing and a shim stack, the outboard bearing configured to encompass a lower end of the valve shaft, the bearing assembly configured to constrain radial loads exerted upon the valve shaft and minimize misalignment of the serrated spline coupling.

In yet another embodiment, by way of example only, the valve includes a flowbody having an inner surface defining a channel; a butterfly plate disposed in the channel and rotationally mounted to the flowbody, the butterfly plate having a valve shaft coupled thereto and positioned at an angle to the inner surface of the flowbody; an actuator having an actuator output shaft coupled to the valve shaft via a serrated spline coupling, the actuator configured to actuate the butterfly plate; an upper bearing assembly disposed within the flowbody and comprising a inboard bearing and an outboard bearing, and a shim stack, the outboard bearing configured to encompass an upper end of the valve shaft and the serrated spline coupling, the inboard bearing comprising an inner race, an outer race and a ball bearing and the outboard bearing comprising an inner race, and outer race and a ball bearing, the outboard bearing stacked in axial alignment with the inboard bearing; and a lower bearing assembly disposed within the flowbody and comprising an outboard bearing and a shim stack, the outboard bearing configured to encompass a lower end of the valve shaft, the outboard bearing comprising an inner race, an outer race and a ball bearing. The upper bearing assembly is configured to create a load path in an axial direction to constrain radial and thrust loads exerted on the valve shaft and minimize misalignment of the serrated spline coupling and the lower bearing assembly is configured to constrain radial loads exerted upon the valve shaft and minimize misalignment of the serrated spline coupling.

Other independent features and advantages of the preferred means for constraining forces exerted upon a serrated spline interface in a butterfly valve will become apparent from the following detailed description, taken in conjunction with the accompanying drawings which illustrate, by way of example, the principles of the inventive subject matter.

DETAILED DESCRIPTION OF A PREFERRED EMBODIMENT

The following detailed description of the inventive subject matter is merely exemplary in nature and is not intended to limit the inventive subject matter or the application and uses of the inventive subject matter. Furthermore, there is no intention to be bound by any theory presented in the preceding background of the inventive subject matter or the following detailed description of the inventive subject matter.

Figure 1:
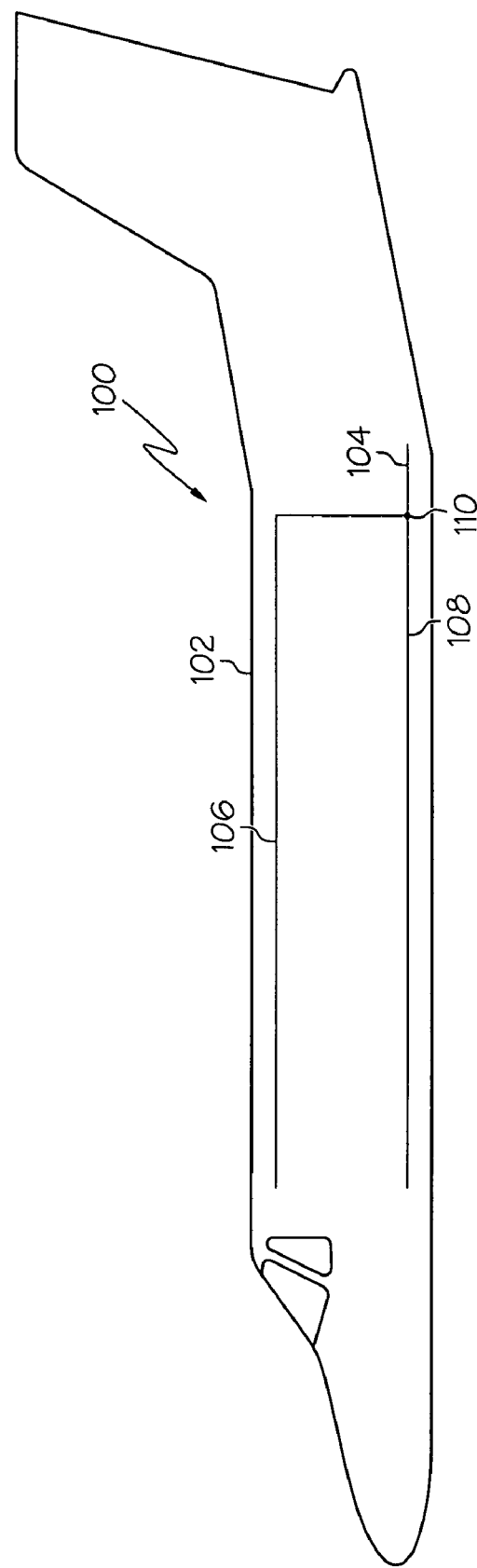
FIG. 1 is a simplified schematic diagram illustrating an exemplary air distribution system disposed within an aircraft, according to an embodiment.

FIG. 1 is a simplified schematic diagram illustrating an air distribution system 100 disposed within an aircraft 102, according to an embodiment. The air distribution system 100 includes an inlet duct 104, two outlet ducts 106, 108 and a valve assembly 110 positioned between the ducts 104, 106, 108. The inlet duct 104 receives air from an air source, such as, for example, engine bleed air, and the outlet ducts 106, 108 exhaust air into desired sections of the aircraft 102. In one exemplary embodiment, the outlet ducts 106, 108 exhaust air into an aircraft underfloor. It will be appreciated that although two outlet ducts 106, 108 are depicted herein, fewer or more outlet ducts may be incorporated into the air distribution system 100. The valve assembly 110 regulates air flow through one or more of the outlet ducts 106, 108 by opening or closing in response to the presence or absence of a pressure differential across the valve assembly 110 that exceeds a predetermined value.

Figure 2:
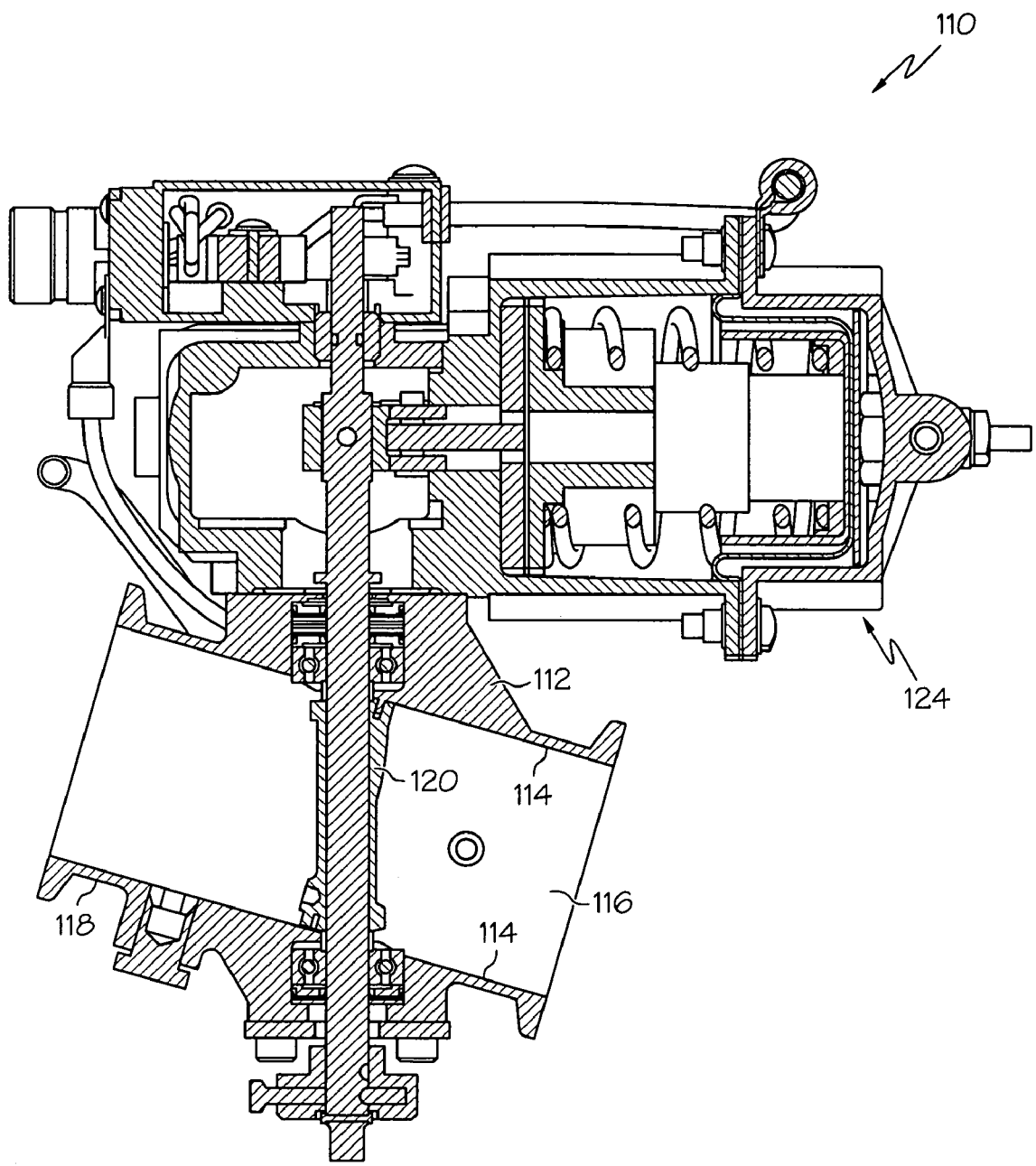
FIG. 2 is a cross-sectional view of a valve assembly that may be implemented into the air distribution system shown in FIG. 1, according to an embodiment.

FIG. 2 is a cross-sectional view of a valve assembly 110 that may be implemented into the air distribution system 100 shown in FIG. 1, according to an embodiment. The valve assembly 110 includes a valve flowbody 112 having an inner surface 114 that defines a channel 116 and an outer surface 118. The valve flowbody 112 is generally made of a metallic material. Examples of suitable materials include aluminum alloys, steel or titanium, to name a few. Although one channel 116 is shown formed in the valve flowbody 112, it will be appreciated that more may alternatively be incorporated. In an embodiment, the valve flowbody 112 may be surrounded by an insulator (not illustrated).

A butterfly plate 120 is disposed in the channel 116 and is rotationally mounted to the valve flowbody 112. The butterfly plate 120 may be coupled to an actuator 124 that causes it to selectively open or close. The actuator 124 may be any actuating mechanism, including, but not limited to, an electric actuator, a pneumatic actuator, a hydraulic actuator, or a manual actuator.

Figure 3:
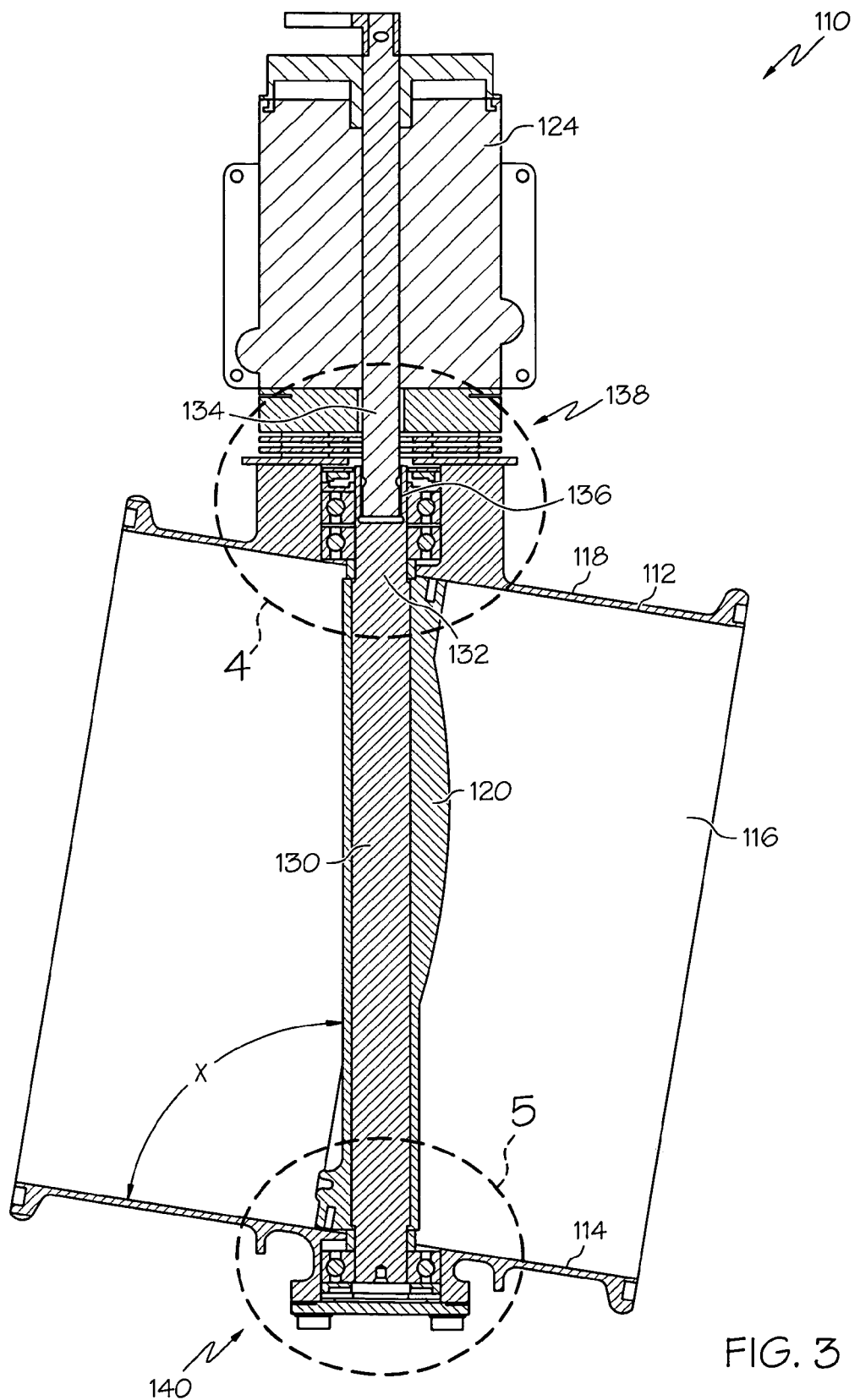
FIG. 3 is a close-up cross-sectional view of a portion of the valve assembly shown in FIG. 2, according to an embodiment.

Referring now to FIG. 3, illustrated is a close up cross-sectional view of a portion of the valve assembly shown in FIG. 2, according to an embodiment. Illustrated is a typical drive mechanism, including a valve shaft 130 coupled to the butterfly plate 120. The valve shaft 130 is coupled at a first, or upper end 132 to an output shaft 134 of the actuator 124 via a serrated spline coupling 136 (described presently). As best illustrated in FIG. 3, the valve shaft 130 is positioned at an angle less than 90° relative to the inner surface 114 that defines the channel 116 of the valve flowbody 112, and more particularly relative to a flow of fluid through the channel 116. The valve shaft 130 is positioned at an angle typically between 0°-90° relative to the flow of fluid through the channel 116. During operation of the valve assembly 110, the flow of fluid through channel 116 generates radial and thrusts loads on the valve shaft 130 resulting in misalignment at an interface of the serrated spline coupling 136 at the first end 132 of the valve shaft 130 and the output shaft 134 of the actuator 124. An upper chimney 138 and a lower chimney 140 of the present invention provide for load constraint and minimize the occurrence of misalignment at the serrated spline coupling 136.

Figure 4:
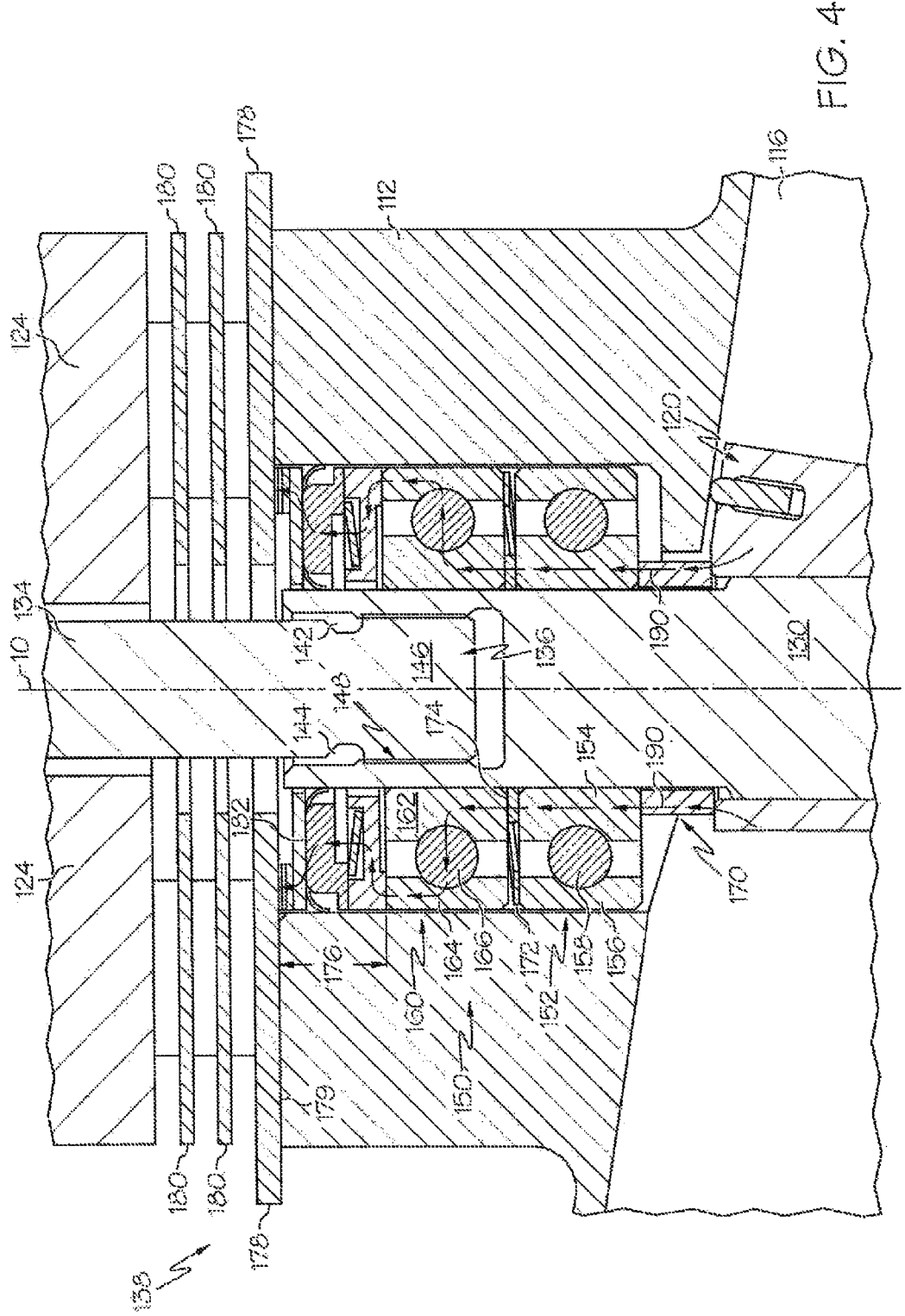
FIG. 4 is a close-up cross-sectional view of an upper bearing support of the valve assembly indicated by a dotted line 3 shown in FIG. 3 in which a means for constraining a serrated spline is implemented, according to an embodiment.

According to an embodiment, FIG. 4 illustrates a close-up cross-sectional view of the upper chimney 138, including an upper bearing support assembly, of the valve assembly 110 indicated by a dotted line 4 shown in FIG. 3 in which a means for constraining the serrated spline coupling 136 is implemented.

As previously mentioned, the valve shaft 130 is coupled at a first end 132 to the actuator 124, and more particularly to the output shaft 134 of the actuator 124, via the serrated spline coupling 136. The serrated spline coupling 136 is generally comprised of a plurality of spline like serrations 142 machined within an internal periphery of the first end 132 of the valve shaft 130 which engage with a plurality of cooperating spline like serrations 144 machined on an outer periphery of a lower end 146 of the output shaft 134 of the actuator 124. The serrated spline coupling 136 provides an interface 148 between the output shaft 134 and the valve shaft 130. It should be understood that the serrated spline coupling 136 of the output shaft 134 and the valve shaft 130 can be manufactured in many different configurations dependent upon the required valve or drive components.

To prevent misalignment at the serrated spline coupling 136, and more particularly at the serrated spline interface 148 between the output shaft 134 and the valve shaft 130, a bearing assembly 150 is provided in the upper chimney 138 to support the valve shaft 130. Differential pressure across the butterfly plate 120 typically causes the valve shaft 130 to deflect (bow). This deflection may cause radial and angular misalignment of the serrated spline coupling 136. The bearing assembly 150 provides a means for carrying, or constraining, the radial and thrust loads in conjunction with restraining the radial and angular displacement of the valve shaft 130 at the serrated spline interface 148.

In a preferred embodiment, the bearing assembly 150, or the upper bearing assembly, incorporates two bearings in the upper chimney 138 of the flowbody or flow section 112. More specifically, the bearing assembly 150 includes an inboard bearing 152 comprising an inner race 154, an outer race 156 and a plurality of ball bearings 158. The bearing assembly 150 further includes an outboard bearing 160 comprising an inner race 162, and outer race 164 and a plurality of ball bearings 166. Each of the inboard bearing 152 and the outboard bearing 160 are pre-loaded during assembly to provide a load path along an axis 10 of the valve shaft 130. To provide for pre-loading, a spacer 170 is provided between the butterfly plate 120 and the inner race 154 of the inboard bearing 152. A spring washer 172 is positioned to load the outer race 156 and the outer race 164. More particularly, the spring washer 172, or an equivalent, is positioned between the outer races 156 and 164 of the bearings 152 and 160 to ensure that the outer races 156 and 164 are constrained under shaft loading from pressures exerted in both an upward and a downward axial direction. A spacer 174 is provided to load the inner race 154 and the inner race 162. A shim stack 176 is positioned between the outboard race 160 and the actuator 124. The shim stack 176 is generally comprised of one or more shims, washers, seals, seal retainers, and spacers. In an embodiment, the shim stack 176 as described includes a seal 182 positioned above the outboard bearing 160 to prevent the seal 182 from rotating with the valve shaft 130. A top plate 178, in conjunction with a plurality of thermal spacers 180, provides thermal shielding and heat dissipation for the bearing assembly 150.

During operation of the valve assembly 110, the bearing assembly 150 provides a load path 190 along the axis 10, also referred to as an upper chimney load path, as illustrated and described as follows: (a) from the butterfly plate 120 to the inner race 154 of the inboard bearing 152 though the spacer 170; (b) from the inner race 154 of the inboard bearing 152 to the inner race 162 of the outboard bearing 160 through the spacer 174; (c) from the inner race 162 of the outboard bearing 160 through the ball bearing 166 to the outer race 164 of the outboard bearing 160; and (d) from the outer race 164 of the outboard bearing 160 though the shim stack 176 to an interface 179 between the actuator 124 and the shim stack 176.

The load path 190 ensures any generated thrust load is absorbed largely by the outboard bearing 160 and any radial load is absorbed largely by the inboard bearing 152. In addition, the outboard bearing 160 provides substantially all of the radial constraint at the serrated spline interface 148 because it is surrounding all or part of the serrated spline coupling 136.

Figure 5:
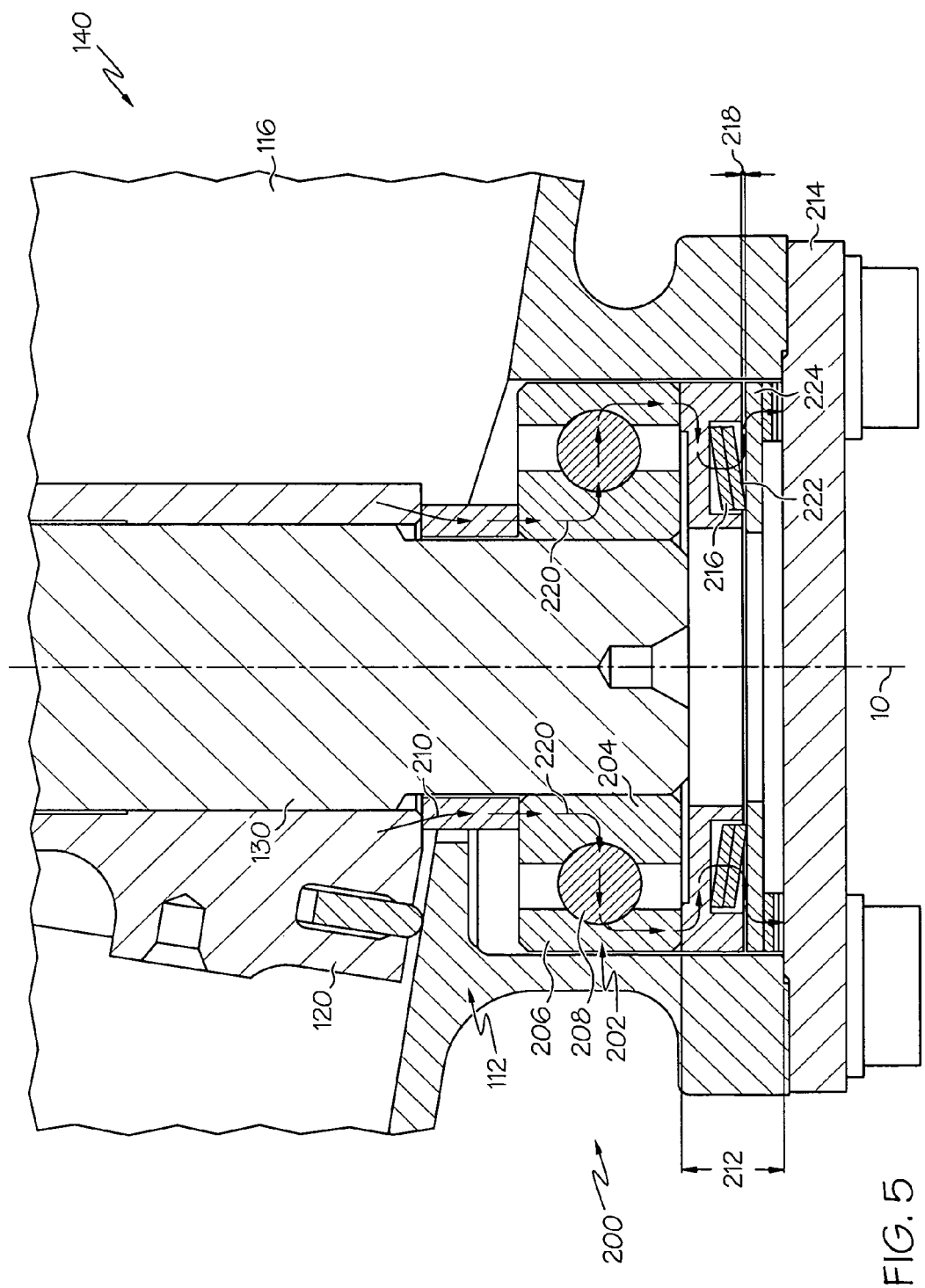
FIG. 5 is a close-up cross-sectional view of a lower bearing support of the valve assembly indicated by a dotted line 4 shown in FIG. 3 in which a means for constraining a serrated spline is implemented, according to an embodiment.

The valve assembly 110 further comprises a bearing assembly 200 provided in the lower chimney 140 to further support the valve shaft 130. According to an embodiment, FIG. 5 illustrates a close-up cross-sectional view of the lower chimney 140, including the bearing assembly 200, indicated by a dotted line 5 shown in FIG. 3 in which a further means for constraining the serrated spline coupling 136 is implemented. The bearing assembly 200, or the lower bearing assembly, provides further assistance in absorbing the radial load for pressure loading of the valve assembly 110 in either direction and carries a substantial majority of the thrust load for pressure loading in the reverse direction.

In a preferred embodiment, the bearing assembly 200 incorporates a single outboard bearing 202 in the lower chimney 140 of the valve flowbody or flow section 112. More specifically, the outboard bearing 202 comprising an inner race 204, an outer race 206 and a ball bearing 208. The outboard bearing 202 is pre-loaded during assembly to provide a load path 220 along an axis 10 of the valve shaft 130. To provide for pre-loading, a spacer 210 is provided between the butterfly plate 120 and an inner race 204 of the outboard bearing 202. A shim stack 212 is positioned between the outboard bearing 202 and a cover plate 214. Similar to the shim stack 176 in the upper chimney 138, the shim stack 212 is generally comprised of one or more shims, washers, seals, seal retainers, and spacers. A plurality of washers 216 of the shim stack 212 provides loading of all the shim stack components in an upward direction. A gap 218 between a lower washer 222 of the plurality of washers 216 and a spacer 224 provides for movement in a downward direction during reverse flow conditions through the valve flowbody 112. The gap 218 is sized to prevent the plurality of washers 216 from unloading and becoming inactive. Furthermore, the gap 218 is sized to ensure that the butterfly plate 120 does not interfere or run into the inner bore of the valve flow body 112 causing binding and or move too far along the axis of the valve shaft 130. The cover plate 214 is positioned to hold the components of the lower chimney in place and prevent leakage to the ambient environment. In addition, the cover plate 214 may provide a small degree of thermal shielding and heat dissipation for the bearing assembly 200.

During operation of the valve assembly 110, the bearing assembly 200 provides a load path 220 along the axis 10, also referred to as a lower chimney load path, as illustrated and described as follows: (a) from the butterfly plate 120 to the inner race 204 of the outboard bearing 202 through the spacer 210; (b) from the inner race 204 of the outboard bearing 202 through the ball bearing 208 to the outer race 206 of the outboard bearing 202; and (c) from the outer race 206 of the outboard bearing 202 through the shim stack 212 to the cover plate 214.

The load path 220 ensures further assistance with the generated radial load and absorption by the outboard bearing 202 and pressure loading of the valve assembly 110 in either direction. In addition, the outboard bearing 202 carries a substantial majority of the thrust load for pressure loading in the reverse direction.

A butterfly valve assembly has now been provided that includes a means for constraining forces exerted upon an interface that exist at a serrated spline coupling between an output shaft of the actuator and the butterfly valve shaft. The inclusion of a bearing assembly in an upper chimney and a bearing assembly in a lower chimney provides for the absorption of radial and thrust loads and minimizes misalignment of an actuator output shaft and the butterfly valve shaft at the serrated spline interface. Additionally, the valve may have an increased life expectancy as compared to conventional valves incorporating serrated spline couplings. In addition, the valve may be lightweight and relatively inexpensive to implement.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. A butterfly valve assembly, comprising:
   a flowbody having an inner surface defining a channel;
   a butterfly plate disposed in the channel and rotationally mounted to the flowbody, the butterfly plate having a valve shaft coupled thereto and positioned at an angle to the inner surface of the flowbody;
   an actuator having an actuator output shaft coupled to the valve shaft via a serrated spline coupling, the actuator configured to actuate the butterfly plate;
   an upper chimney and a lower chimney disposed within the flowbody, the upper chimney and the lower chimney configured to constrain radial loads and thrust loads exerted upon the valve shaft and minimize misalignment of the serrated spline coupling;
   a bearing assembly disposed within the upper chimney and configured to create a load path in an axial direction to constrain radial and thrust loads exerted on the valve shaft, the bearing assembly comprising an inboard bearing, an outboard bearing, and a shim stack, the inboard bearing including an inner race, an outer race and a ball bearing, the outboard bearing stacked in axial alignment with the inboard bearing and including an inner race, an outer race, and a ball bearing;
   a first spacer positioned to provide pre-loading between the butterfly plate and the inner race of the inboard bearing;
   a spring washer positioned to provide pre-loading between the outer race of the inboard bearing and the outer race of the outboard bearing; and
   a second spacer positioned to provide pre-loading between the inner race of the inboard bearing and the inner race of the outboard bearing.

2. The butterfly valve assembly as claimed in claim 1, wherein the lower chimney comprises a bearing assembly configured to create a load path in an axial direction to constrain radial and thrust loads exerted on the valve shaft.

3. The butterfly valve assembly as claimed in claim 2, wherein the bearing assembly comprises an outboard bearing and a shim stack, the outboard bearing configured to encompass a lower end of the valve shaft.

4. The butterfly valve assembly as claimed in claim 3, wherein the outboard bearing includes an inner race, an outer race and a ball bearing.

5. The butterfly valve assembly as claimed in claim 4, further including a spacer positioned to provide pre-loading between the butterfly plate and the inner race of the outboard bearing.

6. The butterfly valve assembly as claimed in claim 5, wherein the load path is present in an axial direction, the load path configured to absorb radial loads exerted upon the valve shaft, wherein the load path extends from the spacer to the inner race of the outboard bearing and through the shim stack.

7. A butterfly valve assembly, comprising:
   a flowbody having an inner surface defining a channel;
   a butterfly plate disposed in the channel and rotationally mounted to the flowbody, the butterfly plate having a valve shaft coupled thereto and positioned at an angle to the inner surface of the flowbody;
   an actuator having an actuator output shaft coupled to the valve shaft via a serrated spline coupling, the actuator configured to actuate the butterfly plate;
   an upper chimney disposed within the flowbody, the upper chimney comprising a bearing assembly including an inboard bearing and an outboard bearing, and a shim stack, the outboard bearing configured to encompass an upper end of the valve shaft and the serrated spline coupling, the bearing assembly configured to create a load path in an axial direction to constrain radial and thrust loads exerted on the valve shaft and minimize misalignment of the serrated spline coupling; and
   a lower chimney disposed within the flowbody, the lower chimney comprising an outboard bearing and a shim stack, the outboard bearing configured to encompass a lower end of the valve shaft, the bearing assembly configured to constrain radial loads exerted upon the valve shaft and minimize misalignment of the serrated spline coupling,
   wherein:
      the inboard bearing of the upper chimney includes an inner race, an outer race, and a ball bearing and the outboard bearing of the upper chimney includes an inner race, an outer race, and a ball bearing, the outboard bearing stacked in axial alignment with the inboard bearing, and
      the upper chimney further includes a first spacer positioned to provide pre-loading between the butterfly plate and the inner race of the inboard bearing, a spring washer positioned to provide pre-loading between the outer race of the inboard bearing and the outer race of the outboard bearing, and a second spacer position to provide pre-loading between the inner race of the inboard bearing and the inner race of the outboard bearing.

8. The butterfly valve assembly as claimed in claim 7, wherein the outboard bearing of the lower chimney includes an inner race, an outer race and a ball bearing.

9. The butterfly valve assembly as claimed in claim 8, further including a spacer positioned to provide pre-loading between the butterfly plate and the inner race of the outboard bearing.

10. The butterfly valve assembly as claimed in claim 9, wherein a lower chimney load path is present in an axial direction, the lower chimney load path configured to absorb radial loads exerted upon the valve shaft, wherein the lower chimney load path extends from the spacer to the inner race of the outboard bearing and through the shim stack.

* * * * *